US009816278B2

(12) United States Patent
Groeke et al.

(10) Patent No.: US 9,816,278 B2
(45) Date of Patent: Nov. 14, 2017

(54) PANEL AND METHOD OF MANUFACTURE

(75) Inventors: Carsten Groeke, Berlin (DE); Martin Prager, Heiligengrabe (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 1016 days.

(21) Appl. No.: 12/858,644

(22) Filed: Aug. 18, 2010

(65) Prior Publication Data

US 2010/0314368 A1 Dec. 16, 2010

Related U.S. Application Data

(62) Division of application No. 11/615,701, filed on Dec. 22, 2006, now Pat. No. 7,827,749.

(30) Foreign Application Priority Data

Dec. 29, 2005 (DE) ........................ 10 2005 063 034

(51) Int. Cl.

| | |
|---|---|
| ***B23K 26/00*** | (2014.01) |
| ***E04F 15/02*** | (2006.01) |
| ***B44C 5/04*** | (2006.01) |
| ***E04F 13/16*** | (2006.01) |
| *E04F 15/04* | (2006.01) |

(52) U.S. Cl.

CPC .............. *E04F 15/02* (2013.01); *B44C 5/043* (2013.01); *E04F 13/165* (2013.01); *E04F 15/02033* (2013.01); *E04F 15/04* (2013.01); *E04F 2201/0115* (2013.01); *E04F 2201/0153* (2013.01); *Y10T 29/49629* (2015.01); *Y10T 428/24777* (2015.01)

(58) Field of Classification Search

CPC ..... E04F 15/02033; E04F 15/04; E04F 15/22; B44C 5/043; B27M 3/06

USPC ............................... 101/4; 144/358; 409/138

See application file for complete search history.

(56) References Cited

U.S. PATENT DOCUMENTS

| | | | |
|---|---|---|---|
| 213,740 | A | 4/1879 | Conner |
| 623,562 | A | 4/1899 | Rider |
| 714,987 | A | 12/1902 | Wolfe |
| 753,791 | A | 3/1904 | Fulghum |
| 1,407,679 | A | 2/1922 | Ruthrauff |
| 1,454,250 | A | 5/1923 | Parsons |
| 1,468,288 | A | 9/1923 | Een |

(Continued)

FOREIGN PATENT DOCUMENTS

| | | |
|---|---|---|
| AT | 005566 | 8/2002 |
| AU | 713628 | 5/1998 |

(Continued)

OTHER PUBLICATIONS

Webster Dictionary, p. 862.

(Continued)

*Primary Examiner* — Jennifer Simmons

(74) *Attorney, Agent, or Firm* — Andrew M. Calderon; Roberts Mlotkowski Safran Cole & Calderon, P.C.

(57) ABSTRACT

A panel, in particular a floor panel, has a core of a wooden material, in particular MDF or HDF, or a wooden material/plastic mixture. A pattern is arranged on a visible side. The visible side is provided on at least one side edge (I, II) with a chamfer running at an angle α hereto and a length (L). The angle α of at least one of the chamfers varies over the length (L).

26 Claims, 4 Drawing Sheets

(56) References Cited

U.S. PATENT DOCUMENTS

| | | | |
|---|---|---|---|
| 1,477,813 | A | 12/1923 | Daniels |
| 1,510,924 | A | 10/1924 | Daniels et al. |
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisch |
| 1,615,096 | A | 1/1927 | Meyers |
| 1,622,103 | A | 3/1927 | Fulton |
| 1,622,104 | A | 3/1927 | Fulton |
| 1,637,634 | A | 8/1927 | Carter |
| 1,644,710 | A | 10/1927 | Crooks |
| 1,660,480 | A | 2/1928 | Daniels |
| 1,714,738 | A | 5/1929 | Smith |
| 1,718,702 | A | 6/1929 | Pfiester |
| 1,734,826 | A | 11/1929 | Pick |
| 1,764,331 | A | 6/1930 | Moratz |
| 1,776,188 | A | 9/1930 | Langb'aum |
| 1,778,069 | A | 10/1930 | Fetz |
| 1,779,729 | A | 10/1930 | Bruce |
| 1,787,027 | A | 12/1930 | Wasleff |
| 1,823,039 | A | 9/1931 | Gruner |
| 1,859,667 | A | 5/1932 | Gruner |
| 1,898,364 | A | 2/1933 | Gynn |
| 1,906,411 | A | 5/1933 | Potvin |
| 1,921,164 | A | 8/1933 | Lewis |
| 1,929,871 | A | 10/1933 | Jones |
| 1,940,377 | A | 12/1933 | Storm |
| 1,946,648 | A | 2/1934 | Taylor |
| 1,953,306 | A | 4/1934 | Moratz |
| 1,986,739 | A | 1/1935 | Mitte |
| 1,988,201 | A | 1/1935 | Hall |
| 2,023,066 | A | 12/1935 | Curtis et al. |
| 2,044,216 | A | 6/1936 | Klages |
| 2,065,525 | A | 12/1936 | Hamilton |
| 2,123,409 | A | 7/1938 | Elmendorf |
| 2,220,606 | A | 11/1940 | Malarkey et al. |
| 2,276,071 | A | 2/1942 | Scull |
| 2,280,071 | A | 4/1942 | Hamilton |
| 2,324,628 | A | 7/1943 | Kähr |
| 2,328,051 | A | 8/1943 | Bull |
| 2,380,885 | A | 7/1945 | Wack |
| 2,398,632 | A | 4/1946 | Frost et al. |
| 2,430,200 | A | 11/1947 | Wilson |
| 2,437,236 | A | 3/1948 | Aas |
| 2,740,167 | A | 4/1956 | Rowley |
| 2,894,292 | A | 7/1959 | Gramelspacker |
| 3,045,294 | A | 7/1962 | Livezey, Jr. |
| 3,100,556 | A | 8/1963 | De Ridder |
| 3,125,138 | A | 3/1964 | Bolenbach |
| 3,182,769 | A | 5/1965 | De Ridder |
| 3,203,149 | A | 8/1965 | Soddy |
| 3,204,380 | A | 9/1965 | Smith et al. |
| 3,209,800 | A | 10/1965 | Leibow |
| 3,241,453 | A | 3/1966 | Baldwin |
| 3,263,722 | A | 8/1966 | Ask |
| 3,267,630 | A | 8/1966 | Omholt |
| 3,282,010 | A | 11/1966 | King, Jr. |
| 3,310,919 | A | 3/1967 | Bue et al. |
| 3,347,048 | A | 10/1967 | Brown et al. |
| 3,460,304 | A | 8/1969 | Braeuniger et al. |
| 3,481,810 | A | 12/1969 | Waite |
| 3,526,420 | A | 9/1970 | Brancaleone |
| 3,538,665 | A | 11/1970 | Gohner |
| 3,553,919 | A | 1/1971 | Omholt |
| 3,555,762 | A | 1/1971 | Costanzo, Jr. |
| 3,608,258 | A | 9/1971 | Spratt |
| 3,694,983 | A | 10/1972 | Couquet |
| 3,714,747 | A | 2/1973 | Curran |
| 3,720,027 | A | 3/1973 | Christensen |
| 3,731,445 | A | 5/1973 | Hoffmann et al. |
| 3,759,007 | A | 9/1973 | Thiele |
| 3,760,548 | A | 9/1973 | Sauer et al. |
| 3,768,846 | A | 10/1973 | Hensley et al. |
| 3,779,294 | A | 12/1973 | Gillis |
| 3,859,000 | A | 1/1975 | Webster |
| 3,878,030 | A | 4/1975 | Cook |
| 3,902,293 | A | 9/1975 | Witt et al. |
| 3,908,053 | A | 9/1975 | Hettich |
| 3,936,551 | A | 2/1976 | Elmendorf et al. |
| 3,988,187 | A | 10/1976 | Witt et al. |
| 4,006,048 | A | 2/1977 | Cannady, Jr. et al. |
| 4,046,180 | A | 9/1977 | Marshall et al. |
| 4,090,338 | A | 5/1978 | Bourgade |
| 4,091,136 | A | 5/1978 | O'Brien et al. |
| 4,099,358 | A | 7/1978 | Compaan |
| 4,118,533 | A | 10/1978 | Hipchen et al. |
| 4,131,705 | A | 12/1978 | Kubinsky |
| 4,164,832 | A | 8/1979 | Van Zandt |
| 4,169,688 | A | 10/1979 | Toshio |
| 4,242,390 | A | 12/1980 | Nemeth |
| 4,243,716 | A | 1/1981 | Kosaka et al. |
| 4,245,689 | A | 1/1981 | Grard et al. |
| 4,246,310 | A | 1/1981 | Hunt et al. |
| 4,290,248 | A | 9/1981 | Kemerer et al. |
| 4,299,070 | A | 11/1981 | Oltmanns et al. |
| 4,426,820 | A | 1/1984 | Terbrack et al. |
| 4,431,044 | A | 2/1984 | Bruneau |
| 4,471,012 | A | 9/1984 | Maxwell |
| 4,501,102 | A | 2/1985 | Knowles |
| 4,561,233 | A | 12/1985 | Harter et al. |
| 4,585,685 | A | 4/1986 | Forry et al. |
| 4,612,745 | A | 9/1986 | Hovde |
| 4,641,469 | A | 2/1987 | Wood |
| 4,653,242 | A | 3/1987 | Ezard |
| 4,654,244 | A | 3/1987 | Eckert et al. |
| 4,703,597 | A | 11/1987 | Eggemar |
| 4,715,162 | A | 12/1987 | Brightwell |
| 4,738,071 | A | 4/1988 | Ezard |
| 4,752,497 | A | 6/1988 | McConkey et al. |
| 4,769,963 | A | 9/1988 | Meyerson |
| 4,819,932 | A | 4/1989 | Trotter, Jr. |
| 4,831,806 | A | 5/1989 | Niese et al. |
| 4,845,907 | A | 7/1989 | Meek |
| 4,905,442 | A | 3/1990 | Daniels |
| 4,947,602 | A | 8/1990 | Pollasky |
| 5,029,425 | A | 7/1991 | Bogataj |
| 5,103,614 | A | 4/1992 | Kawaguchi et al. |
| 5,113,632 | A | 5/1992 | Hanson |
| 5,117,603 | A | 6/1992 | Weintraub |
| 5,136,823 | A | 8/1992 | Pellegrino |
| 5,165,816 | A | 11/1992 | Parasin |
| 5,179,812 | A | 1/1993 | Itill |
| 5,205,091 | A | 4/1993 | Brown |
| 5,216,861 | A | 6/1993 | Meyerson |
| 5,251,996 | A | 10/1993 | Hiller et al. |
| 5,253,464 | A | 10/1993 | Nilsen |
| 5,283,102 | A | 2/1994 | Sweet et al. |
| 5,295,341 | A | 3/1994 | Kajiwara |
| 5,335,473 | A | 8/1994 | Chase |
| 5,348,778 | A | 9/1994 | Knipp et al. |
| 5,349,796 | A | 9/1994 | Meyerson |
| 5,390,457 | A | 2/1995 | Sjölander |
| 5,413,834 | A | 5/1995 | Hunter et al. |
| 5,433,806 | A | 7/1995 | Pasquali et al. |
| 5,474,831 | A | 12/1995 | Nystrom |
| 5,497,589 | A | 3/1996 | Porter |
| 5,502,939 | A | 4/1996 | Zadok et al. |
| 5,540,025 | A | 7/1996 | Takehara et al. |
| 5,567,497 | A | 10/1996 | Zegler et al. |
| 5,570,554 | A | 11/1996 | Searer |
| 5,597,024 | A | 1/1997 | Bolyard et al. |
| 5,630,304 | A | 5/1997 | Austin |
| 5,653,099 | A | 8/1997 | MacKenzie |
| 5,671,575 | A | 9/1997 | Wu |
| 5,694,734 | A | 12/1997 | Cercone et al. |
| 5,706,621 | A | 1/1998 | Pervan |
| 5,736,227 | A | 4/1998 | Sweet et al. |
| 5,768,850 | A | 6/1998 | Chen |
| 5,797,175 | A | 8/1998 | Schneider |
| 5,797,237 | A | 8/1998 | Finkell, Jr. |
| 5,823,240 | A | 10/1998 | Bolyard et al. |
| 5,827,592 | A | 10/1998 | Van Gulik et al. |
| 5,860,267 | A | 1/1999 | Pervan |
| 5,935,668 | A | 8/1999 | Smith |

(56) References Cited

U.S. PATENT DOCUMENTS

| | | | | |
|---|---|---|---|---|
| 5,943,239 | A | 8/1999 | Shamblin et al. | |
| 5,953,878 | A | 9/1999 | Johnson | |
| 5,968,625 | A | 10/1999 | Hudson | |
| 5,985,397 | A | 11/1999 | Witt et al. | |
| 5,987,839 | A | 11/1999 | Hamar et al. | |
| 6,006,486 | A | 12/1999 | Moriau et al. | |
| 6,023,907 | A | 2/2000 | Pervan | |
| 6,065,262 | A | 5/2000 | Motta | |
| 6,094,882 | A | 8/2000 | Pervan | |
| 6,101,778 | A | 8/2000 | Martensson | |
| 6,119,423 | A | 9/2000 | Costantino | |
| 6,134,854 | A | 10/2000 | Stanchfield | |
| 6,148,884 | A | 11/2000 | Bolyard et al. | |
| 6,168,866 | B1 | 1/2001 | Clark | |
| 6,182,410 | B1 | 2/2001 | Pervan | |
| 6,186,703 | B1 | 2/2001 | Shaw | |
| 6,205,639 | B1 | 3/2001 | Pervan | |
| 6,209,278 | B1 | 4/2001 | Tychsen | |
| 6,216,403 | B1 | 4/2001 | Belbeoc'h | |
| 6,216,409 | B1 | 4/2001 | Roy et al. | |
| D442,296 | S | 5/2001 | Külik | |
| D442,297 | S | 5/2001 | Külik | |
| D442,298 | S | 5/2001 | Külik | |
| D442,706 | S | 5/2001 | Külik | |
| D442,707 | S | 5/2001 | Külik | |
| 6,224,698 | B1 | 5/2001 | Endo | |
| 6,238,798 | B1 | 5/2001 | Kang et al. | |
| 6,247,285 | B1 | 6/2001 | Moebus | |
| D449,119 | S | 10/2001 | Külik | |
| D449,391 | S | 10/2001 | Külik | |
| D449,392 | S | 10/2001 | Külik | |
| 6,324,803 | B1 | 12/2001 | Pervan | |
| 6,345,481 | B1 | 2/2002 | Nelson | |
| 6,363,677 | B1 | 4/2002 | Chen et al. | |
| 6,397,547 | B1 | 6/2002 | Martensson | |
| 6,418,683 | B1 | 7/2002 | Martensson et al. | |
| 6,421,970 | B1 | 7/2002 | Martensson et al. | |
| 6,427,408 | B1 | 8/2002 | Krieger | |
| 6,436,159 | B1 | 8/2002 | Safta et al. | |
| 6,438,919 | B1 | 8/2002 | Knauseder | |
| 6,446,405 | B1 | 9/2002 | Pervan | |
| 6,449,913 | B1 | 9/2002 | Shelton | |
| 6,449,918 | B1 | 9/2002 | Nelson | |
| 6,453,632 | B1 | 9/2002 | Huang | |
| 6,458,232 | B1 | 10/2002 | Valentinsson | |
| 6,460,306 | B1 | 10/2002 | Nelson | |
| 6,461,636 | B1 | 10/2002 | Arth et al. | |
| 6,465,046 | B1 | 10/2002 | Hansson et al. | |
| 6,490,836 | B1 | 12/2002 | Moriau et al. | |
| 6,497,961 | B2 | 12/2002 | Kang et al. | |
| 6,510,665 | B2 | 1/2003 | Pervan | |
| 6,516,579 | B1 | 2/2003 | Pervan | |
| 6,517,935 | B1 | 2/2003 | Kornfalt et al. | |
| 6,519,912 | B1 | 2/2003 | Eckmann et al. | |
| 6,521,314 | B2 | 2/2003 | Tychsen | |
| 6,532,709 | B2 | 3/2003 | Pervan | |
| 6,533,855 | B1 | 3/2003 | Gaynor et al. | |
| 6,536,178 | B1 | 3/2003 | Pervan | |
| 6,546,691 | B2 | 4/2003 | Peopolder | |
| 6,553,724 | B1 | 4/2003 | Bigler | |
| 6,558,754 | B1 | 5/2003 | Velin et al. | |
| 6,565,919 | B1 | 5/2003 | Hansson et al. | |
| 6,569,272 | B2 | 5/2003 | Tychsen | |
| 6,588,166 | B2 | 7/2003 | Martensson et al. | |
| 6,591,568 | B1 | 7/2003 | Pålsson | |
| 6,601,359 | B2 | 8/2003 | Olofsson | |
| 6,606,834 | B2 | 8/2003 | Martensson et al. | |
| 6,617,009 | B1 | 9/2003 | Chen et al. | |
| 6,635,174 | B1 | 10/2003 | Berg et al. | |
| 6,641,629 | B2 | 11/2003 | Safta et al. | |
| 6,646,088 | B2 | 11/2003 | Fan et al. | |
| 6,647,690 | B1 | 11/2003 | Martensson | |
| 6,649,687 | B1 | 11/2003 | Gheewala et al. | |
| 6,659,097 | B1 | 12/2003 | Houston | |
| 6,672,030 | B2 | 1/2004 | Schulte | |
| 6,681,820 | B2 | 1/2004 | Olofsson | |
| 6,682,254 | B1 | 1/2004 | Olofsson et al. | |
| 6,685,993 | B1 | 2/2004 | Hansson et al. | |
| 6,711,864 | B2 | 3/2004 | Erwin | |
| 6,711,869 | B2 | 3/2004 | Tychsen | |
| 6,715,253 | B2 | 4/2004 | Pervan | |
| 6,723,438 | B2 | 4/2004 | Chang et al. | |
| 6,729,091 | B1 | 5/2004 | Martensson | |
| 6,745,534 | B2 | 6/2004 | Kornfalt | |
| 6,761,008 | B2 | 7/2004 | Chen et al. | |
| 6,761,794 | B2 | 7/2004 | Mott et al. | |
| 6,763,643 | B1 | 7/2004 | Martensson | |
| 6,766,622 | B1 | 7/2004 | Thiers | |
| 6,769,217 | B2 | 8/2004 | Nelson | |
| 6,769,218 | B2 | 8/2004 | Pervan | |
| 6,769,835 | B2 | 8/2004 | Stridsman | |
| 6,772,568 | B2 | 8/2004 | Thiers et al. | |
| 6,775,545 | B2 | 8/2004 | Chen et al. | |
| 6,786,019 | B2 | 9/2004 | Thiers | |
| 6,803,109 | B2 | 10/2004 | Qiu et al. | |
| 6,805,951 | B2 | 10/2004 | Kornfält et al. | |
| 6,823,638 | B2 | 11/2004 | Stanchfield | |
| 6,841,023 | B2 | 1/2005 | Mott | |
| 6,907,702 | B2 | 6/2005 | Gilbert et al. | |
| 7,137,229 | B2 | 11/2006 | Pervan | |
| 8,056,236 | B2 * | 11/2011 | Brouckaert et al. | 29/897.32 |
| 1,124,228 | A1 | 1/2015 | Houston | |
| 2001/0029720 | A1 | 10/2001 | Pervan | |
| 2001/0034992 | A1 | 11/2001 | Pletzer et al. | |
| 2002/0007608 | A1 | 1/2002 | Pervan | |
| 2002/0007609 | A1 | 1/2002 | Pervan | |
| 2002/0014047 | A1 | 2/2002 | Thiers | |
| 2002/0020127 | A1 | 2/2002 | Thiers et al. | |
| 2002/0046528 | A1 | 4/2002 | Pervan et al. | |
| 2002/0056245 | A1 | 5/2002 | Thiers | |
| 2002/0106439 | A1 | 8/2002 | Cappelle | |
| 2002/0160680 | A1 | 10/2002 | Laurence et al. | |
| 2003/0024200 | A1 | 2/2003 | Moriau et al. | |
| 2003/0024201 | A1 | 2/2003 | Moriau et al. | |
| 2003/0029115 | A1 | 2/2003 | Moriau et al. | |
| 2003/0029116 | A1 | 2/2003 | Moriau et al. | |
| 2003/0029117 | A1 | 2/2003 | Moriau et al. | |
| 2003/0033777 | A1 | 2/2003 | Thiers et al. | |
| 2003/0033784 | A1 | 2/2003 | Pervan | |
| 2003/0115812 | A1 | 6/2003 | Pervan | |
| 2003/0115821 | A1 | 6/2003 | Pervan | |
| 2003/0159385 | A1 | 8/2003 | Thiers | |
| 2003/0167717 | A1 | 9/2003 | Garcia | |
| 2003/0196405 | A1 | 10/2003 | Pervan | |
| 2003/0205013 | A1 | 11/2003 | Garcia | |
| 2003/0233809 | A1 | 12/2003 | Pervan | |
| 2004/0009320 | A1 | 1/2004 | Garcia | |
| 2004/0016196 | A1 | 1/2004 | Pervan | |
| 2004/0035078 | A1 | 2/2004 | Pervan | |
| 2004/0092006 | A1 | 5/2004 | Lindekens et al. | |
| 2004/0105994 | A1 | 6/2004 | Lu et al. | |
| 2004/0139678 | A1 | 7/2004 | Pervan | |
| 2004/0159066 | A1 | 8/2004 | Thiers et al. | |
| 2004/0177584 | A1 | 9/2004 | Pervan | |
| 2004/0191547 | A1 | 9/2004 | Oldorff | |
| 2004/0200165 | A1 | 10/2004 | Garcia et al. | |
| 2004/0206036 | A1 | 10/2004 | Pervan | |
| 2004/0237447 | A1 | 12/2004 | Thiers et al. | |
| 2004/0237448 | A1 | 12/2004 | Thiers et al. | |
| 2004/0241374 | A1 | 12/2004 | Thiers et al. | |
| 2004/0244322 | A1 | 12/2004 | Thiers et al. | |
| 2004/0250493 | A1 | 12/2004 | Thiers et al. | |
| 2004/0255541 | A1 | 12/2004 | Thiers et al. | |
| 2004/0258907 | A1 | 12/2004 | Kornfalt et al. | |
| 2005/0003149 | A1 | 1/2005 | Kornfalt et al. | |
| 2005/0016099 | A1 | 1/2005 | Thiers | |
| 2005/0025934 | A1 | 2/2005 | Thiers | |
| 2005/0076598 | A1 | 4/2005 | Lewark | |
| 2005/0175424 | A1 * | 8/2005 | Brooks | 409/138 |
| 2007/0059492 | A1 | 3/2007 | Oldorff | |

(56) References Cited

U.S. PATENT DOCUMENTS

| | | | |
|---|---|---|---|
| 2009/0159156 A1 | 6/2009 | Walker | |
| 2009/0178359 A1 | 7/2009 | Garcia | |

FOREIGN PATENT DOCUMENTS

| | | |
|---|---|---|
| AU | 200020703 | 1/2000 |
| BE | 417526 | 9/1936 |
| BE | 557844 | 6/1957 |
| BE | 557844 | 3/1960 |
| BE | 09600527 | 6/1998 |
| BE | 09700344 | 10/1998 |
| CA | 991373 | 6/1976 |
| CA | 2226286 | 12/1997 |
| CA | 2252791 | 5/1999 |
| CA | 2289309 | 7/2000 |
| CH | 200949 | 1/1939 |
| CH | 562377 | 5/1975 |
| CH | 211877 | 1/1994 |
| DE | 314207 | 9/1919 |
| DE | 531989 | 8/1931 |
| DE | 740235 | 10/1943 |
| DE | 1089966 | 9/1960 |
| DE | 1534278 | 2/1966 |
| DE | 1212225 | 3/1966 |
| DE | 1212275 | 3/1966 |
| DE | 1534802 | 4/1970 |
| DE | 7102476 | 6/1971 |
| DE | 2007129 | 9/1971 |
| DE | 1534278 | 11/1971 |
| DE | 2252643 | 10/1972 |
| DE | 2238660 | 2/1974 |
| DE | 7402354 | 5/1974 |
| DE | 2502992 | 7/1976 |
| DE | 2616077 | 10/1977 |
| DE | 2917025 | 11/1980 |
| DE | 7911924 | 3/1981 |
| DE | 7928703 | 5/1981 |
| DE | 3041781 | 6/1982 |
| DE | 3214207 | 11/1982 |
| DE | 8226153 | 1/1983 |
| DE | 3343601 | 6/1985 |
| DE | 86040049 | 6/1986 |
| DE | 3512204 | 10/1986 |
| DE | 3246376 | 2/1987 |
| DE | 4004891 | 9/1990 |
| DE | 4002547 | 8/1991 |
| DE | 4134452 | 4/1993 |
| DE | 4215273 | 11/1993 |
| DE | 4242530 | 6/1994 |
| DE | 4011656 | 1/1995 |
| DE | 4324137 | 1/1995 |
| DE | 4107151 | 2/1995 |
| DE | 29517128 | 2/1996 |
| DE | 4242530 | 9/1996 |
| DE | 3544845 | 12/1996 |
| DE | 29710175 | 9/1997 |
| DE | 19616510 | 3/1998 |
| DE | 19651149 | 6/1998 |
| DE | 19709641 | 9/1998 |
| DE | 19718319 | 11/1998 |
| DE | 19735189 | 6/2000 |
| DE | 20001225 | 8/2000 |
| DE | 19925248 | 12/2000 |
| DE | 20017461 | 3/2001 |
| DE | 20018284 | 3/2001 |
| DE | 10124081 | 6/2002 |
| DE | 20206460 | 8/2002 |
| DE | 20311568 | 10/2003 |
| DE | 20315676 | 1/2004 |
| DE | 20218331 | 5/2004 |
| DE | 10256501 | 7/2004 |
| EP | 0248127 | 12/1987 |
| EP | 0623724 | 11/1994 |
| EP | 06523340 | 5/1995 |
| EP | 0667936 | 8/1995 |
| EP | 0690185 | 1/1996 |
| EP | 0849416 | 6/1998 |
| EP | 0698162 | 9/1998 |
| EP | 0903451 | 3/1999 |
| EP | 0855482 | 12/1999 |
| EP | 0877130 | 1/2000 |
| EP | 0969163 | 1/2000 |
| EP | 0969164 | 1/2000 |
| EP | 0974713 | 1/2000 |
| EP | 0843763 | 10/2000 |
| EP | 1200690 | 5/2002 |
| EP | 0958441 | 7/2003 |
| EP | 1026341 | 8/2003 |
| ES | 163421 | 9/1968 |
| ES | 460194 | 5/1978 |
| ES | 283331 | 5/1985 |
| ES | 1019585 | 12/1991 |
| ES | 1019585 | 1/1992 |
| ES | 2168045 | 5/2002 |
| FI | 843060 | 8/1984 |
| FR | 1293043 | 4/1962 |
| FR | 2691491 | 11/1983 |
| FR | 2568295 | 5/1986 |
| FR | 2623544 | 5/1989 |
| FR | 2630149 | 10/1989 |
| FR | 2637932 | 4/1990 |
| FR | 2675174 | 10/1991 |
| FR | 2667639 | 4/1992 |
| FR | 2691491 | 11/1993 |
| FR | 2697275 | 4/1994 |
| FR | 2712329 | 5/1995 |
| FR | 2776956 | 10/1999 |
| FR | 2781513 | 1/2000 |
| FR | 2785633 | 5/2000 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1033866 | 6/1966 |
| GB | 1034117 | 6/1966 |
| GB | 1044846 | 10/1966 |
| GB | 1127915 | 9/1968 |
| GB | 1237744 | 9/1968 |
| GB | 1275511 | 5/1972 |
| GB | 1399402 | 7/1975 |
| GB | 1430423 | 3/1976 |
| GB | 2117813 | 10/1983 |
| GB | 2126106 | 3/1984 |
| GB | 2152063 | 7/1985 |
| GB | 2243381 | 10/1991 |
| GB | 2256023 | 11/1992 |
| GB | 2238660 | 6/1996 |
| JP | 54-65528 | 5/1979 |
| JP | 57-119056 | 7/1982 |
| JP | 59-186336 | 10/1984 |
| JP | 3-169967 | 7/1991 |
| JP | 4-106264 | 4/1992 |
| JP | 5-148984 | 6/1993 |
| JP | 6-56310 | 5/1994 |
| JP | 6-146553 | 5/1994 |
| JP | 6-200611 | 7/1994 |
| JP | 6-320510 | 11/1994 |
| JP | 7-76923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 8-270193 | 10/1996 |
| NE | 7601773 | 2/1976 |
| NO | 157871 | 2/1988 |
| NO | 305614 | 6/1999 |
| SE | 7114900-9 | 9/1974 |
| SE | 450411 | 6/1987 |
| SE | 450141 | 9/1987 |
| SE | 501014 | 10/1994 |
| SE | 501914 | 6/1995 |
| SE | 502994 | 4/1996 |
| SE | 506254 | 11/1997 |

(56) References Cited

FOREIGN PATENT DOCUMENTS

| | | |
|---|---|---|
| SE | 509059 | 11/1998 |
| SE | 509060 | 11/1998 |
| SE | 512290 | 2/2000 |
| SE | 512313 | 2/2000 |
| SE | 0000200-6 | 8/2001 |
| SU | 363795 | 12/1972 |
| WO | 84/02155 | 6/1984 |
| WO | 87/03839 | 7/1987 |
| WO | 89/08539 | 9/1989 |
| WO | 92/17657 | 10/1992 |
| WO | 93/13280 | 7/1993 |
| WO | 93/19910 | 10/1993 |
| WO | 94/01628 | 1/1994 |
| WO | 94/26999 | 11/1994 |
| WO | 9426999 | 11/1994 |
| WO | 95/06176 | 3/1995 |
| WO | 96/27719 | 9/1996 |
| WO | 96/27721 | 9/1996 |
| WO | 96/30177 | 10/1996 |
| WO | 97/47834 | 12/1997 |
| WO | 98/24495 | 6/1998 |
| WO | 98/24994 | 6/1998 |
| WO | 98/38401 | 9/1998 |
| WO | 9940273 | 8/1999 |
| WO | 99/66151 | 12/1999 |
| WO | 9966152 | 12/1999 |
| WO | 0006854 | 2/2000 |
| WO | 0066856 | 11/2000 |
| WO | 0166876 | 9/2001 |
| WO | 2005066431 | 7/2005 |

OTHER PUBLICATIONS

Opposition II EPO. 698. 162—Facts—Arguments Evidence (11 pages)—translation.

U.S. Court of Appeals for the Federal Circuit, 02-1222-1291 *Alloc, Inc.* vs.*International Trade Commission*, pp. 1-32.

U.S. Court of Appeals for the Federal Circuit Decision in *Alloc, Inc. et al.* vs. *International Trade Commission and Pergs, Inc. et al.* decided Sep. 10, 2003.

* cited by examiner

PANEL AND METHOD OF MANUFACTURE

CROSS-REFERENCE TO RELATED APPLICATIONS

The present application is a divisional application of application Ser. No. 11/615,701, filed on Dec. 22, 2006 which further claims priority under 35 U.S.C. §119 of German Patent Application No. 10 2005 063 034.0, filed on Dec. 29, 2005, the disclosures of which are expressly incorporated by reference herein in their entirety.

BACKGROUND OF THE INVENTION

1. Field of the Invention

The invention relates to a panel, in particular a floor panel, with a core of a wooden material, in particular MDF or HDF, or a wooden material/plastic mixture and a pattern arranged on a visible side, whereby the visible side is provided on at least one side edge with a chamfer running at an angle $\alpha$.

2. Discussion of Background Information

In panels, the pattern is either printed directly on the top of the panel or applied to a paper web which, together with a synthetic resin layer, is pressed to the visible side of the board. The chamfer is produced by milling the side edge. Subsequently, a corresponding decorative strip is adhesively bonded to the chamfer or the pattern is printed on the visible side by transfer printing. In particular if the floor panel is made to look like wood, that is, the pattern is provided with a structure (differences in color) that corresponds to the grain of genuine wood, a relief is often embossed into the synthetic resin layer that covers the decorative layer. The relief is designed to underscore the genuine wood character by way of the resulting indentations or elevations.

Compared to genuine wood panels, the laminate panels have the advantage that they are harder, more loadable, easier to handle, easier to care for, have greater variation and are more versatile. In order to increase consumer acceptance, though, attempts have been made to adapt the appearance and feel of the panel to a genuine wood panel as naturally as possible. For example, a V-groove is formed between two panels connected to one another through the chamfer milled on the side edges. These grooves reflect the look of a joint true to the original.

SUMMARY OF THE INVENTION

The invention is directed to the development of the known panel such that the area covered with the panels approximates more closely in look and feel one of natural materials (e.g., genuine wood, terracotta, stone). To attain such features, the generic panel is provided with an angle $\alpha$ of at least one chamfer which varies over the length.

Through this embodiment, a chamfer of irregular width is produced which forms a V joint with panels connected to one another. The joint through the irregular upper edge simulates an aged structure such as occurs through signs of wear on panels of natural materials after years of use.

It is advantageous if the chamfers are also provided with a pattern.

A relief is preferably embossed into the surface of the chamfers so that the look and feel of the joint are adapted to the top of the board.

The pattern is preferably printed directly onto the visible side of the board and/or the chamfer. By doing this, the decorative paper or the carrier layer necessary for the transfer print is omitted, which reduces production costs. Moreover, an embodiment of this kind means that the application of a synthetic resin layer first can be omitted.

In the case of conventional panels, corundum particles are inserted in the synthetic resin layer, which is generally a paper impregnated with melamine resin, in order to increase the abrasion resistance. These corundum particles lead to a high level of tool wear. Through the printing of the decoration directly onto the board, a melamine resin can be applied in liquid form or sprayed or rolled, optionally in several layers, onto the top of the board including the chamfer, and after hardening the relief is embossed.

A method for producing the panel with the differing chamfer angle is also provided. The method includes the side edge of the panel being guided past an oscillating machining tool. The machining tool preferably oscillates about an axis running parallel to the transport direction of the panel.

If a laser is used as a machining tool, the machining is carried out in a wear-free manner. Moreover, it is also advantageous that the control of a laser cutter is simple and no cutting forces act on the panel.

In further embodiments, a panel comprises a core of a wooden material, and a pattern arranged on a visible side thereof. The visible side is provided on at least one side edge (I, II) with a chamfer running at an angle with a length (L) of the chamfer. The angle varies over the length (L).

In further embodiments, the chamfer includes a pattern 20. A relief (also shown at 20) is embossed in a surface of the chamfer. The pattern on the chamfer is covered with a synthetic resin layer and the relief is embossed in the synthetic resin layer. The pattern is printed directly onto at least one of the visible side and the chamfer. The pattern has a structure. The relief embossed in a surface of the chamfer and corresponds to the structure. Two opposite side edges (I, II) include the chamfer. All side edges of the panel include the chamfer. The core is one of MDF, HDF, and wooden material/plastic mixture. The structure is a wood grain. The panel comprises a tongue and groove having a locking mechanism configured to lock joined panels in a horizontal direction. The chamfer is flat or curved in a convex or concave manner. A size of the angle changes arbitrarily over the length (L) of the chamfer. The angle varies in a range of 15°-89°. The angle varies between 37° and 42°. A lower edge of the chamfer runs straight, based on the visible side, such that an impermeable connection of two panels is provided.

In still further embodiments, a method for producing a panel comprises guiding a side edge (I or II) of the panel past an oscillating machining tool to form a chamfer having angle which varies over a length. The machining tool oscillates about an axis running parallel to a transport direction (T) of the panel. The machining tool is a laser. The machining tool has a mass unbalance 21 to generate the oscillation.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
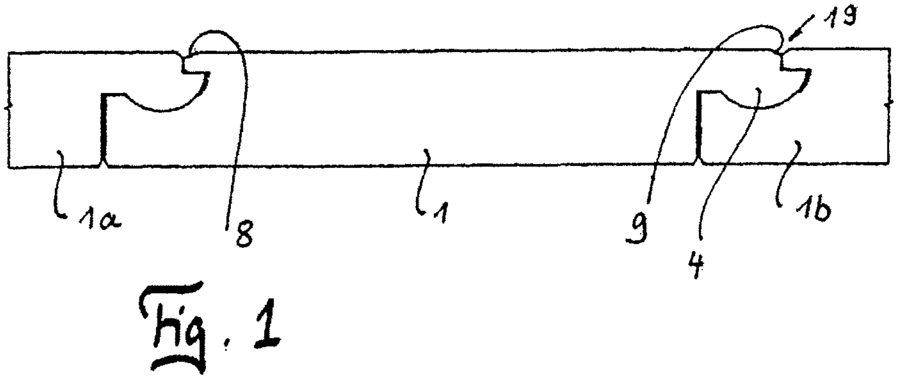
FIG. 1 shows a side view of three panels connected to one another in partial representation.
Figure 2:
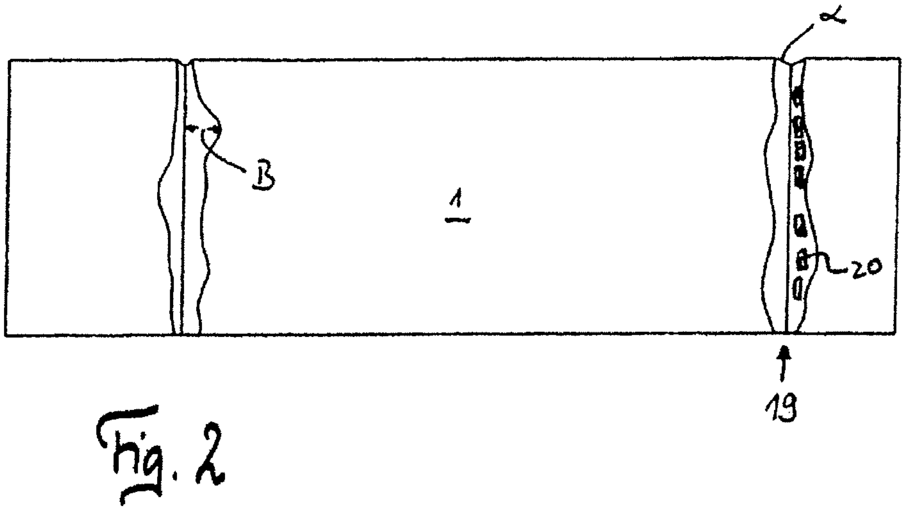
FIG. 2 shows a plan view of the panels according to FIG. 1.
Figure 3:
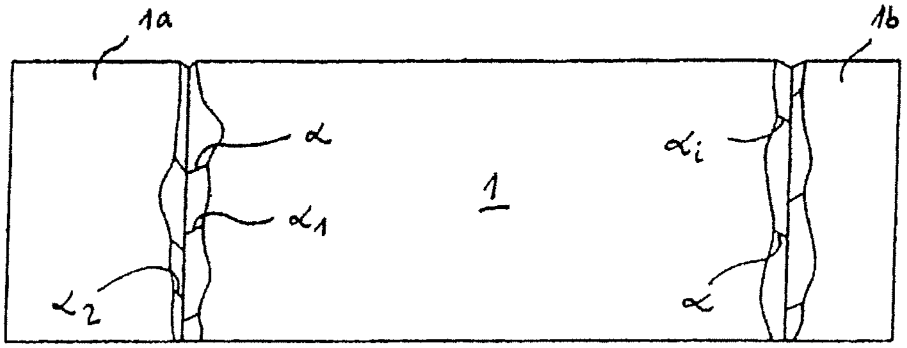
FIG. 3 shows a representation of FIG. 2 with different angles indicated.
Figure 4:
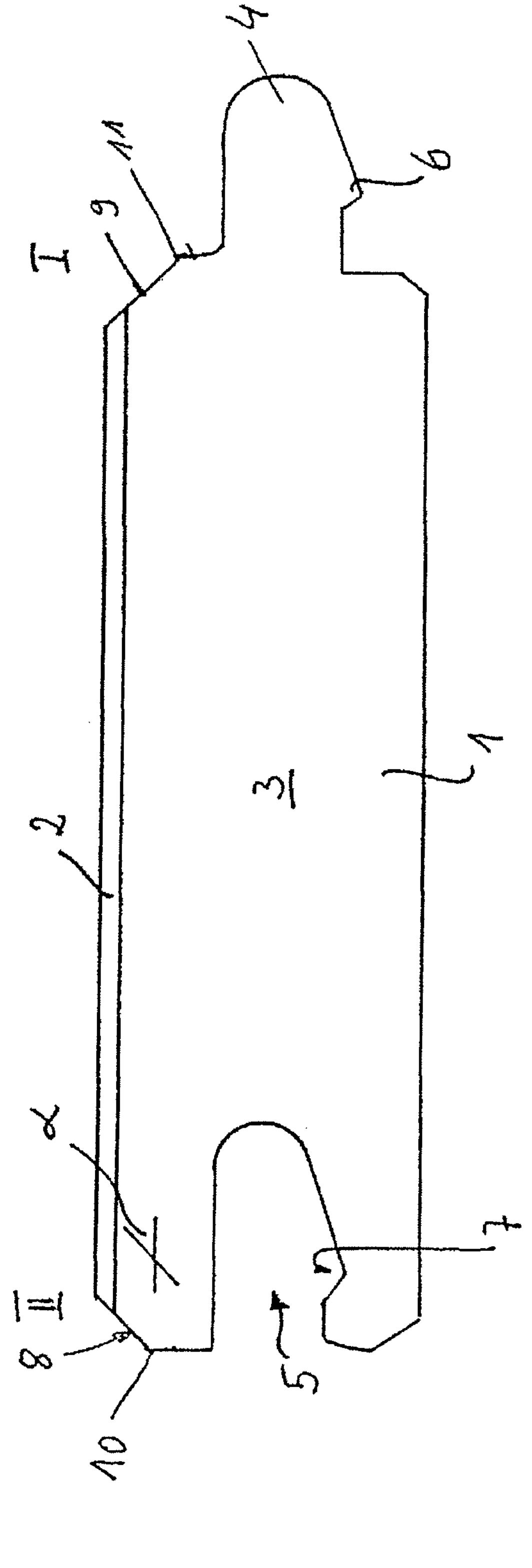
FIG. 4 shows an exemplary embodiment of a panel in side view.
Figure 5:
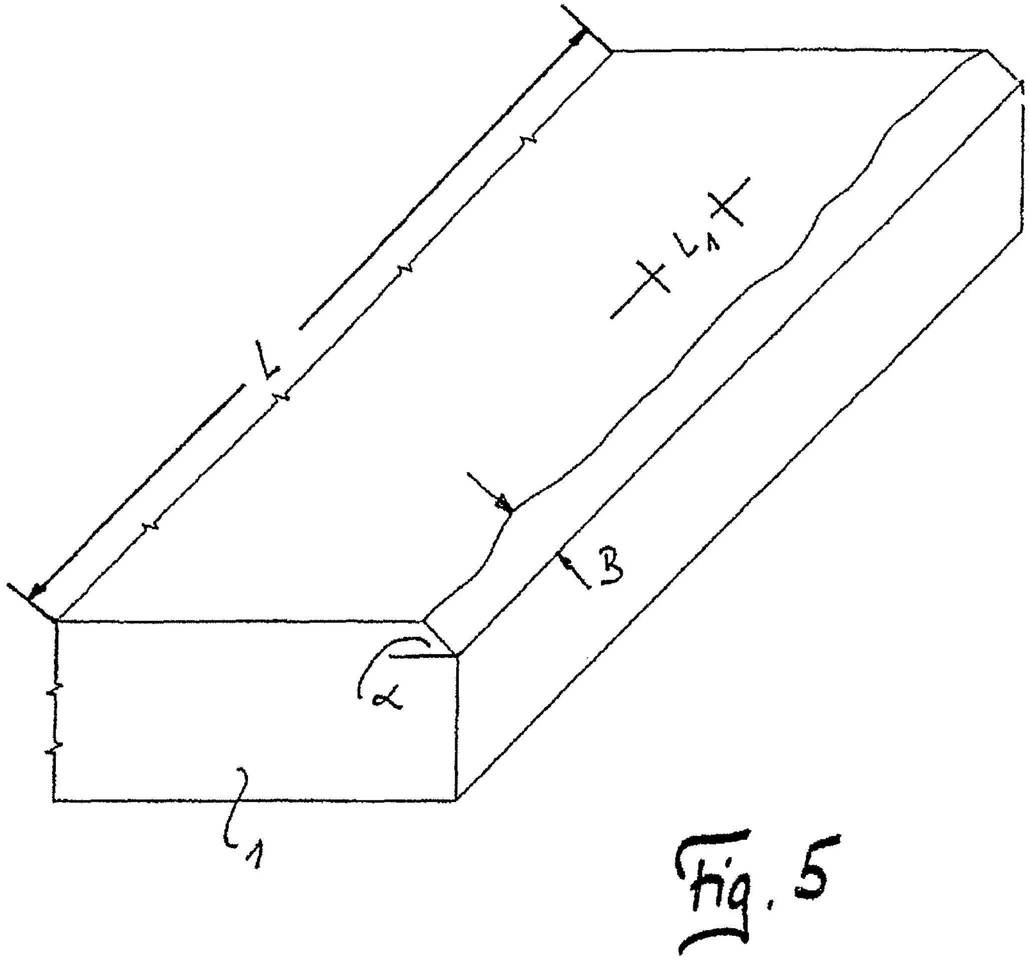
FIG. 5 shows a schematic representation of the chamfer on a panel in perspective representation.

Referring to FIGS. 1-6 and more specifically FIG. 4, the core 3 of the panel 1 comprises a wooden material, in particular MDF or HDF, a wooden material/plastic mixture or a pure plastic mixture. The visible side of the panel 1 is provided with a pattern 2. On the opposite side edges I, II, the panel 1 has a tongue 4 or a groove 5 corresponding thereto. The tongue 4 and groove 5 are provided with locking means 6, 7, via which two panels 1, 1*a* connected to one another can be locked to one another so that they can be laid without glue. Such panels are called click-in panels.

On the opposite side edges I, II, the panel 1 is provided with a chamfer 8, 9 that is embodied over the length L of the panel 1 at different angles $\alpha$, $\alpha_1$, $\alpha_i$ of less than 1° to 75°, e.g., see FIG. 3. The size of the angles $\alpha$, $\alpha_1$, $\alpha_2$ does not change continuously, but arbitrarily, whereby the size of the angles $\alpha$, $\alpha_1$, $\alpha_2$ changes over the length $L_1$ of the area of the chamfer 8, 9, which is determined iteratively in an area embodied at a constant angle $\alpha_1$, in order to obtain a V joint that is "worn" in the most natural looking manner possible. To this end, for example, the joint of a floor of genuine wood panels having the corresponding appearance of wear can be measured and the angles and lengths transferred accordingly.

As FIG. 2 shows, the width B of the chamfers 8, 9 or the width of the V joint 19 differs due to the changing angle $\alpha$, $\alpha_1$, $\alpha_2$ over the length L of the panel 1, 1*a*, 1*b*. The chamfers 8, 9 can be embodied to be flat or curved in a convex or concave manner. The angles $\alpha$, $\alpha_1$, $\alpha_2$ vary in the range of 15°-89°. Visually attractive joints can be produced with angles a between 37° and 42° of the chamfers 8, 9.

Referring again to FIG. 4, the lower edge 10, 11 of the chamfers 8, 9 runs straight, based on the visible side, to ensure that an impermeable connection of two panels 1*a*, 1*b*, 1*c* is guaranteed and no moisture can penetrate via the vertical joint. The chamfers 8, 9 are varnished or coated with a melamine resin. The pattern of the chamfer 8, 9 is adapted to the pattern 2 on the visible side.

A variety of chamfer geometries can be produced by means of a laser cutting head 13 attached to a CNC support 12. In such an embodiment, the cutting head is connected with a light guide to the beam source.

Figure 6:
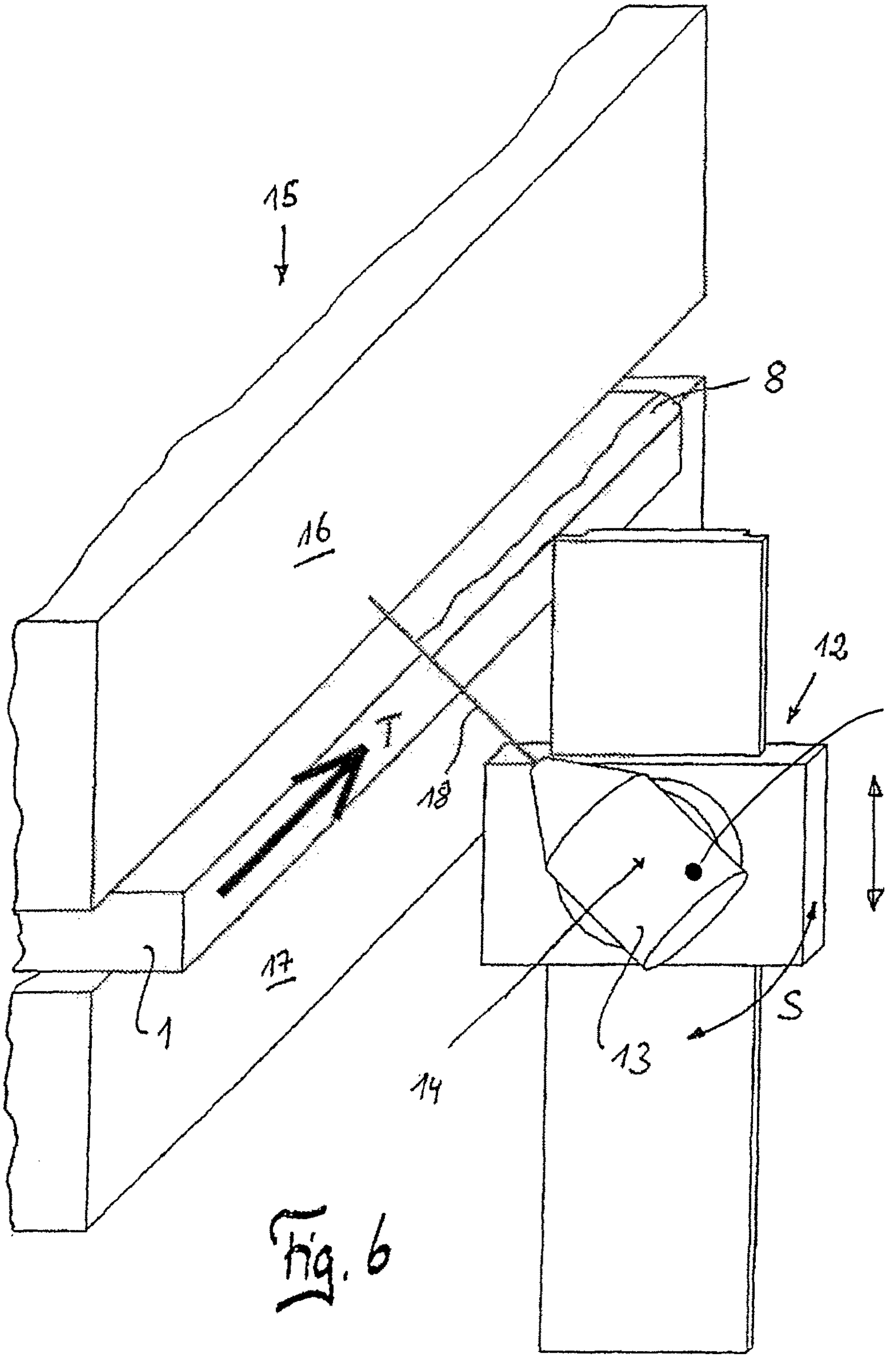
FIG. 6 shows a simplified sketch of a production step.

As FIG. 6 shows, the panel 1 to be machined is guided in a so-called double-end profiler 15 and transported in the transport direction T. The top and/or bottom of panel 1 comes into contact with a chain-like conveyor device (not shown in detail) which conveys the panel 1 along its direction of movement T. The panel 1 passes through different machining stations.

In the machining stations, the side edges of the panel 1 projecting out of the conveyor 15 are predominantly machined. For example, the tongue 4 and the groove 6 are milled.

In order to increase the precision during machining, the panel 1 is guided through between two metal plates 16, 17 and fixed by pressure shoes. Finally, the panel 1 is guided past the laser 13, which oscillates about the axis 14 running parallel to the transport direction T in the direction S. The CNC support 12 oscillates up and down depending on the laser oscillation S so that the lower edge 10, 11 of the chamfers 8, 9 remains constant. The frequency of the oscillation of the laser 13 is non-uniform but reproducible. The angle $\alpha$ is generated on the panel 1 depending on the angle of the laser 13 to the axis 14. The laser beam 18 vaporizes the material it hits and penetrates the panel 1. The residual beam hits a special beam trap and is destroyed there.

Naturally, conventional chip-removing machining tools (e.g., mills, planes) can be used instead of the laser 13. To produce the oscillating movement of the machining tool, it can also be provided with a mass unbalance.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

It is claimed:

1. A method for producing a panel with a core of a wooden material, comprising guiding a side edge (I or II) of the panel past an oscillating laser which has a mass unbalance to generate an oscillation about an axis running parallel to a transport direction (T) of the panel to form a chamfer having an angle which at different points along a length of the panel have different values, wherein the angle at the different points forms angles $\alpha$, $\alpha_1$, $\alpha_2$ which are arbitrary and non-continuous and changes over a length ($L_1$) of an area of the chamfer, wherein the angle is determined iteratively in an area embodied at a constant angle in order to obtain a V joint of different widths due to the changing angles $\alpha$, $\alpha_1$, $\alpha_2$ over the length of the panel, and a lower edge of the chamfer is cut straight, based on the visible side, such that an impermeable connection of two panels is provided.

2. The method according to claim 1, wherein a pattern is directly printed on the top of the panel.

3. The method according to claim 1, wherein a pattern is applied to a paper web which together with a synthetic resin layer is pressed to a visible side of the panel.

4. The method according to claim 1, wherein a pattern is printed out directly onto the chamfer.

5. The method according to claim 4, wherein a relief is embossed in a surface of the chamfer.

6. The method according to claim 5, wherein onto the pattern on the chamfer a synthetic resin layer is applied and the relief is embossed in the synthetic resin layer.

7. The method according to claim 4, wherein the pattern is printed directly onto at least one of the visible side and the chamfer.

8. The method according to claim 4, further comprising embossing a relief in a surface of the chamfer which corresponds to a structure of the pattern.

9. The method according to claim 8, wherein the structure is a wood grain.

10. The method according to claim 1, wherein a chamfer is formed at two opposite side edges (I, II) of the panel.

11. The method according to claim 10, wherein the chamfer is formed at all side edges of the panel.

12. The method according to claim 1, wherein a size of an angle of the chamfer varies arbitrarily over the length (L) of the chamfer.

13. The method according to claim 12, wherein the angle at a point along the panel varies in a range of 15°-89°.

14. The method according to claim 13, wherein the angle at a point along the panel varies between 37°and 42°.

15. The method according to claim 1, wherein the chamfer is flat or curved in a convex or concave manner.

16. The method according to claim 1, wherein the wooden material is MDF or HDF or a wooden material/plastic mixture.

17. A method for producing a panel, comprising guiding a side edge (I or II) of the panel past an oscillating laser tool which has a mass unbalance to generate an oscillation about an axis running parallel to a transport direction (T) of the panel to form a chamfer having an angle which at different points along a length of the panel have different values and at its lower edge of the chamfer runs straight, based on a visible side, such that an impermeable connection of two panels is provided.

18. The method according to claim 17, wherein the angle is in a range of 15°-89°.

19. The method according to claim 18, wherein a relief is embossed in a surface of the chamfer.

20. The method according to claim 19, wherein a pattern is printed directly on a visible side of a core of the panel and the chamfer such that the visible side is devoid of a decorative paper or carrier layer.

21. The method according to claim 20, wherein a synthetic resin layer is applied on the chamfer.

22. The method according to claim 21, wherein a relief is embossed in the synthetic resin layer surface of the chamfer which corresponds to the pattern printed directly onto the visible side and the chamfer.

23. The method according to claim 17, wherein the laser tool oscillates about an axis running parallel to a transport direction (T) of the panel.

24. The method according to claim 17, wherein the laser tool is a laser.

25. A method for producing a panel with a core of a wooden material, comprising guiding a side edge (I or II) of the panel past an oscillating laser which has a mass unbalance to generate an oscillation about an axis running parallel to a transport direction (T) of the panel to form a chamfer having an angle which at different points along a length of the panel have different values, wherein a size of an angle of the chamfer varies arbitrarily over the length (L) of the chamfer in a range of 15°-89°, wherein the angle at the different points forms angles $\alpha$, $\alpha_1$, $\alpha_2$ which are arbitrary and non-continuous and changes over a length ($L_1$) of an area of the chamfer, wherein the angle is determined iteratively in an area embodied at a constant angle in order to obtain a V joint of different widths due to the changing angles $\alpha$, $\alpha_1$, $\alpha_2$ over the length of the panel and a lower edge of the chamfer is cut straight, based on a visible side, such that an impermeable connection of two panels is provided.

26. A method for producing a panel with a core of a wooden material, comprising guiding a side edge (I or II) of the panel past an oscillating laser which oscillates about an axis running parallel to a transport direction (T) of the panel to form a chamfer having an angle which at different points along a length of the panel have different values, wherein:

a size of an angle of the chamfer varies arbitrarily over the length (L) of the chamfer in a range of 15°-89° and at a lower edge of the chamfer remains constant based on a visible side, such that an impermeable connection of two panels is provided;

a pattern is printed out directly onto the chamfer;

a relief is embossed in a surface of the chamfer; and onto the pattern on the chamfer a synthetic resin layer is applied and the relief is embossed in the synthetic resin layer, wherein to increase precision during machining, the panel is guided through and between two plates and guided past the oscillating laser.

* * * * *